Oct. 14, 1958   G. H. MULLER ET AL   2,856,201
INDEPENDENT WHEEL SUSPENSION FOR MOTOR VEHICLES
Filed Sept. 12, 1956   2 Sheets-Sheet 1

G. H. MULLER
H. R. FORTGANG
E. C. McRae
J. R. Faulkner
J. H. Oster
INVENTORS

BY

ATTORNEYS

Oct. 14, 1958  G. H. MULLER ET AL  2,856,201
INDEPENDENT WHEEL SUSPENSION FOR MOTOR VEHICLES
Filed Sept. 12, 1956  2 Sheets-Sheet 2

G.H. MULLER
H.R. FORTGANG
INVENTORS.

BY E. C. McRae
J. R. Faulkner
J. H. Oster

ATTORNEYS

United States Patent Office 2,856,201
Patented Oct. 14, 1958

2,856,201

INDEPENDENT WHEEL SUSPENSION FOR MOTOR VEHICLES

George H. Muller, Northville, and Herbert R. Fortgang, Detroit, Mich., assignors to Ford Motor Company, Dearborn, Mich., a corporation of Delaware Application September 12, 1956, Serial No. 609,487

5 Claims. (Cl. 280—124)

This invention relates generally to motor vehicles, and has particular reference to an independent wheel suspension for a motor vehicle.

It is an object of the present invention to provide a motor vehicle wheel suspension in which a torsion bar, a control arm and a telescopic strut cooperate to guide the rising and falling movements of the vehicle wheel and to take the various loads to which the wheel is subjected as well as to form the spring suspension therefor. The invention comprises an improvement on the construction shown in U. S. Patent No. 2,757,747, issued August 7, 1956, to E. S. MacPherson, and assigned to the same assignee.

In an embodiment of the invention the wheel hub is rigidly connected to a telescopic strut which in turn is connected to the vehicle frame or body structure adjacent its upper end. The wheel hub is also connected to a triangulated linkage comprising a transversely extending control arm pivotally connected to the vehicle frame at its inner end and a longitudinally extending torsion bar pivotally connected at its forward end to the vehicle frame for pivotal movement about a generally horizontal transversely extending axis. The rearward end of the torsion bar and the outer end of the control arm are rigidly connected together and the juncture is connected by means of a shackle to the wheel hub in such manner as to permit free rotation about two axes extending generally at right angles to each other, one axis being transverse and the other longitudinal. The torsion bar, control arm, telescopic strut, and shackle cooperate with each other to properly guide the wheel in its rising and falling movements, and the arrangement is such that the bar is torsionally stressed as the wheel rises and falls to form the spring suspension for the vehicle.

Other objects and advantages of this invention will be made more apparent as this description proceeds, particularly when considered in connection with the accompanying drawings, wherein.

Figure 1:
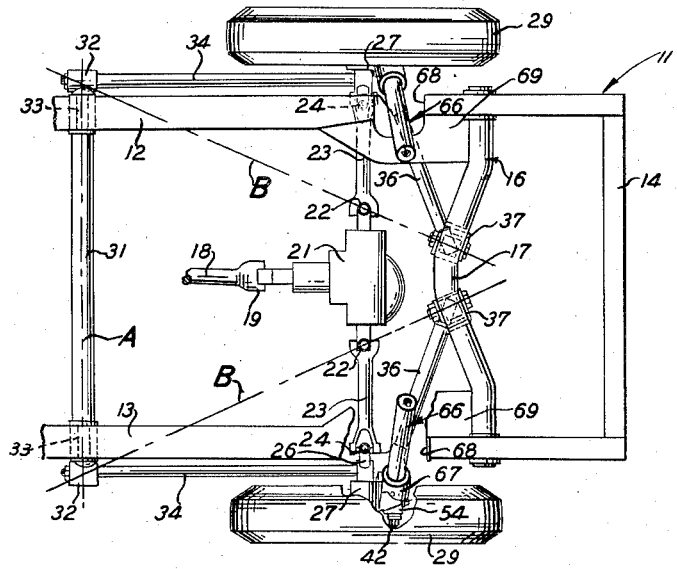
Figure 1 is a plan view of the rearward portion of a motor vehicle chassis incorporating the present invention.

Referring now to the drawings, the reference character 11 indicates generally the frame of a motor vehicle having side frame rails 12 and 13 joined at their rearward ends by a cross frame member 14. Spaced forwardly of the rear cross frame member 14 is another cross frame member 16 extending generally transversely and secured at its outer ends to the side frame rails. The cross member 16 is tubular in cross section and its central portion 17 is bowed forwardly.

Power from the vehicle engine (not shown) is transmitted through a propeller shaft 18 and a universal joint 19 to conventional differential and drive gearing contained within a central housing 21. The housing 21 is supported upon the vehicle frame in conventional fashion, and is connected by means of universal joints 22 to driven axle shafts 23 extending laterally outwardly and connected by universal joints 24 to stub axle shafts 26 journaled in wheel hubs 27. The outer end of each stub axle shaft is provided with a mounting flange 28 supporting a rear wheel 29.

As best seen in Figure 1, the side frame rails 12 and 13 support a tubular cross member 31 extending through the box section side frame rails and welded thereto. As more fully described in the said U. S. Patent No. 2,757,747, issued to E. S. MacPherson, a pair of torsion bar end supports 32 are formed with shanks 33 extending into the ends of the tubular cross member 31 and pivotally supported thereby for pivotal movement about a common horizontal transversely extending axis A.

Each torsion bar end support 32 nonrotatably receives the splined forward end of a longitudinally extending torsion bar 34 extending along the outboard side of the adjacent side frame rail. The rearward end of the torsion bar 34 is connected in a manner to be described later to the outer end of a generally transversely extending control arm 36. The control arms 36 are tubular, and at their inner ends are pivotally connected to brackets 37 depending downwardly from the forwardly bowed central portion 17 of the tubular cross frame member 16. In the present instance the pivotal connections lie on inclined axes B extending through the torsion bar front end supports 32 and the inner universal joints 22. The pivotal connections may comprise rubber bushings.

Figure 4:
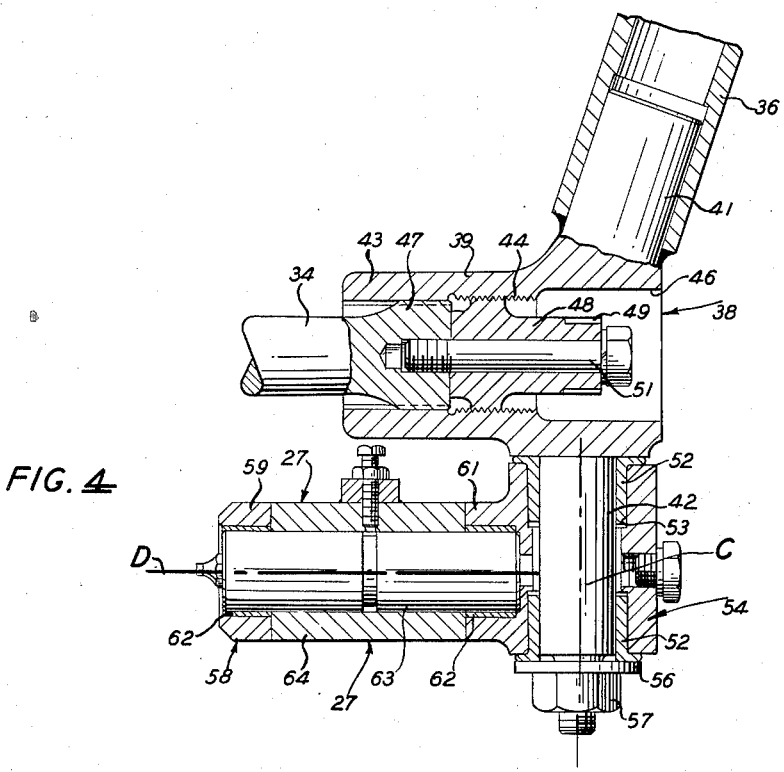
Figure 4 is an enlarged horizontal cross sectional view taken on the plane indicated by the line 4—4 of Figure 2.

Reference is now made to Figure 4 for a description of the manner in which the rearward end of the torsion bar 34 and the outer end of the control arm 36 are interconnected. In the present instance this interconnection is effected by means of a member 38 having a hub 39, an integral stub shaft 41 projecting inwardly and an integral stub shaft 42 projecting outwardly.

The shaft portion 41 of the member 38 is received within the tubular outer end of the control arm 36 and is welded thereto.

The hub of the member 38 is formed with an internally splined portion 43, an internally threaded intermediate portion 44, and an enlarged end cavity 46. The rearward end 47 of the torsion bar 34 is enlarged and is externally splined for engagement with the splined portion 43 of the hub to nonrotatably secure the torsion bar to the hub. An adjusting sleeve 48 is threaded into the internally threaded portion 44 of the hub 39 and is formed with a hexagonal end portion 49 to receive a tool to effect longitudinal adjustment of the sleeve within the hub. A stud 51 extends through the sleeve 48 and into the enlarged end 47 of the torsion bar 34 to clamp the torsion bar to the sleeve. It will be seen that the stud 51 may be loosened and the sleeve rotated to vary the longitudinal position of the sleeve, and consequently the torsion bar, relative to the hub 39 of the member 38. This permits adjustment to be made during assembly of the suspension to the vehicle frame to compensate for variations and provide the proper alignment.

As previously mentioned, the integral stub shaft portion 42 of the interconnecting member 38 extends transversely outwardly and is generally horizontal. It is received within bearings 52 supported within a transversely extending bore 53 of a shackle member 54 to permit relative rotation about the transversely extending axis C. A washer 56 and nut 57 are carried at the reduced outer end of the shaft portion 42 to complete the assembly.

Figure 2:
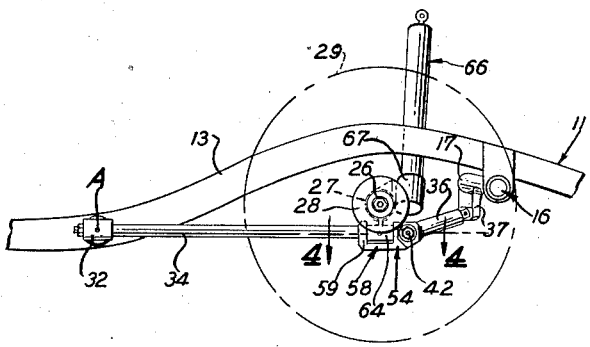
Figure 2 is a side elevation of the construction shown in Figure 1.
Figure 3:
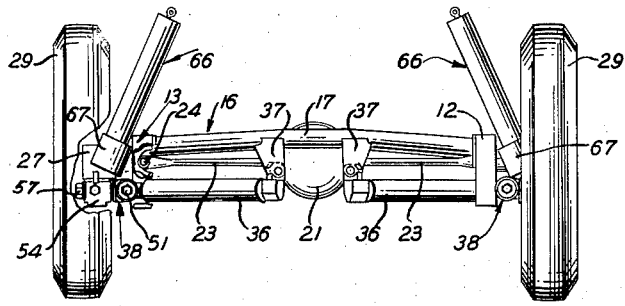
Figure 3 is a rear elevation of the construction shown in Figure 1.

Integrally formed with the shackle 54 is a forward extension 58 generally U-shaped as seen in side elevation in Figure 2 and having longitudinally spaced upwardly extending flanges 59 and 61. The flanges 59 and 61 are apertured to receive bushings 62 rotatably supporting a shaft 63 which forms a pivotal mounting for a downwardly depending extension 64 of the wheel hub 27. It will be seen that this provides for pivotal movement between the shackle 54 and the wheel hub 27 about a longitudinally extending axis D, which extends generally at right angles to the axis C.

During wheel jounce and rebound movement, the triangulated linkage comprising the torsion bar 34 and the control arm 36 swings about the inclined axis B. As previously mentioned, the torsion bar 34 and the control arm 36 are rigidly interconnected by means of the member 38 so that the member 38 with its outwardly projecting stub shaft 42 likewise swings about the axis B during jounce and rebound. The shaft portion 42 of the interconnecting member 38 is in turn connected to the wheel hub 27 by means of the shackle 54 which, it will be remembered, accommodates pivotal movement between the shackle 54 and the shaft 42 about the transversely extending axis C and also accommodates pivotal movement between the shackle and the wheel hub 27 about the longitudinally extending axis D. At the same time, the wheel hub 27 is controlled in its rising and falling movements by means of a telescopic strut 66. At its lower end 67 the telescopic strut is rigidly secured as by welding to the wheel hub 27, while at its upper end the telescopic strut is suitably secured in conventional fashion to a portion of the vehicle frame or body structure (not shown). This upper connection may comprise a flexible rubber mounting to accommodate limited angular movement of the strut. If desired, the strut may incorporate conventional hydraulic shock absorber structure (not shown).

During jounce and rebound pivotal movement takes place about the perpendicular axes C and D of the shackle 54. This pivotal movement in combination with the swinging movement of the torsion bar and control arm about the axis B and the telescopic extension or contraction of the strut 66 provides proper geometric control of the wheel movement to form an efficient independent suspension system.

In the present instance the side frame rails 12 and 13 are separated at 68 to provide clearance for the telescopic strut 66 and are interconnected for suitable strength by means of reinforcing frame members 69.

If desired, the axes C and D of the shackle 54 connecting the triangular suspension linkage to the wheel hub may be arranged in a suitable angular relationship other than perpendicular to provide required roll and understeer characteristics.

Figure 5:
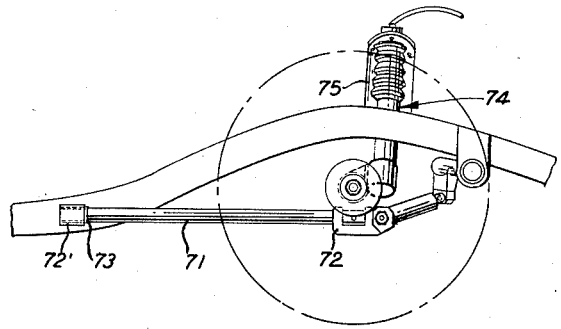
Figure 5 is a side elevational view of a modification.

In the modification shown in Figure 5, a tubular member 71 replaces the torsion bar 34 of the form of the invention shown in Figures 1 to 4 inclusive. The member 71 is rigidly connected to the shackle 72 at its rearward end and is connected at its forward end to the end support 72 by means of an internally and externally threaded bushing 73 so the member 71 will rotate freely at its forward end and will not be torsionally stressed. The end member 72' is mounted for rotation about a horizontal transverse axis in the same manner as the member 32 of the Figure 1–4 embodiment.

With this type of suspension separate spring means of any desired type may be employed. For example a combined hydraulic shock absorber and telescopic control member 74 of the type disclosed in my copending application, Serial No. 486,498, filed February 7, 1955, may be employed, having its upper end connected to a frame bracket 75.

The term "frame" as used in the specification and claims is intended to refer to the structural portion of a convention frame type vehicle or an integral frame and body type vehicle.

It will be understood that the invention is not to be limited to the exact construction shown and described, but that various changes and modifications may be made without departing from the spirit and scope of the invention, as defined in the appended claims.

What is claimed is:

1. In an independent suspension system for a motor vehicle having a pair of longitudinally extending side frame rails interconnected near their rearward ends by a transversely extending cross frame member, a pair of supporting members one adjacent each side frame rail and each having means thereon to rotatably mount a nonsteerable wheel, a pair of longitudinally extending torsion bars one adjacent each frame rail and extending generally parallel thereto and pivotally connected at their forward ends to said frame rail for pivotal movement about a generally horizontal transverse axis, a pair of generally transversely extending control arms pivotally connected at their inner ends to said cross frame member adjacent the longitudinal center line of the vehicle and extending transversely outwardly therefrom toward said wheel supporting members, means interconnecting the adjacent ends of said torsion bars and said control arms, shackles pivotally connected to said interconnecting means for relative pivotal movement about transversely extending axes, means pivotally connecting said shackles to said wheel supporting members for relative pivotal movement about longitudinally extending axes, and a second suspension element at each side of said vehicle having portions connected respectively to said vehicle frame and to the adjacent wheel supporting member.

2. The structure defined by claim 1 which is further characterized in that said second suspension elements comprise telescopic struts rigidly connected at their lower ends to said wheel supporting members and extending generally vertically upwardly therefrom, the upper ends of said telescopic struts being connected to said vehicle frame.

3. In an independent suspension system for a motor vehicle having a frame and a nonsteerable rear road wheel, a wheel supporting member mounting said road wheel for rotation about its axis only, a telescopic strut rigidly connected at its lower end to said wheel supporting member and connected at its upper end to said vehicle frame, a transversely extending control arm pivotally connected at its inner end to said vehicle frame, a longitudinally extending torsion bar pivotally connected at its forward end to said vehicle frame, means interconnecting the opposite ends of said control arm and torsion bar, and a member pivotally connected to said interconnecting means for relative rotation about a transversely extending axis, said member being pivotally connected to said wheel supporting member for pivotal movement about a longitudinally extending axis.

4. In an independent suspension system for a motor vehicle having a frame and a road wheel, a wheel supporting member mounting said road wheel for rotation about its axis, a generally transversely extending control arm pivotally connected at its inner end to said vehicle frame, a generally longitudinally extending torsion bar pivotally connected at one end to said vehicle frame, means rigidly connecting the opposite ends of said control arm and said torsion bar to each other, an interconnecting member pivotally connected to said connected control arm and torsion bar and to said wheel supporting member about angularly related axes, and a second suspension element having portions connected respectively to said vehicle frame and said wheel supporting member.

5. In an independent suspension system for a motor vehicle having a frame and a road wheel, a wheel supporting member mounting said road wheel for rotation about its axis, a generally transversely extending control arm pivotally connected at its inner end to said vehicle frame, a generally longitudinally extending torsion bar pivotally connected at one end to said vehicle frame, means rigidly connecting the opposite ends of said control arm and said torsion bar to each other, an interconnecting member pivotally connected to said rigidly connected control arm and torsion bar for relative rotation about a generally transversely extending axis, said interconnecting member being pivotally connected to said wheel supporting member for relative rotation about a generally longitudinally extending axis, said axes being substantially at right angles to each other, and a second suspension element having portions connected respectively to said vehicle frame and said wheel support member.

References Cited in the file of this patent

UNITED STATES PATENTS

| | | |
|---|---|---|
| 2,083,627 | Youngren | June 15, 1937 |
| 2,624,592 | MacPherson | Jan. 6, 1953 |
| 2,757,747 | MacPherson | Aug. 7, 1956 |
| 2,768,002 | Rabe et al. | Oct. 23, 1956 |
| 2,780,477 | Schjolin | Feb. 5, 1957 |